United States Patent
Ramcharitar et al.

(10) Patent No.: US 9,751,463 B1
(45) Date of Patent: Sep. 5, 2017

(54) ENABLING IMPROVED EMERGENCY RESPONSE VIA A VEHICLE FLOW BUFFER

(71) Applicants: Satesh S. Ramcharitar, Hollywood, FL (US); Brian K. Buchheit, Davie, FL (US)

(72) Inventors: Satesh S. Ramcharitar, Hollywood, FL (US); Brian K. Buchheit, Davie, FL (US)

( * ) Notice: Subject to any disclaimer, the term of this patent is extended or adjusted under 35 U.S.C. 154(b) by 0 days.

(21) Appl. No.: 14/854,116

(22) Filed: Sep. 15, 2015

Related U.S. Application Data

(60) Provisional application No. 62/050,460, filed on Sep. 15, 2014.

(51) Int. Cl.
G08G 1/16 (2006.01)
B60Q 9/00 (2006.01)
G08G 1/08 (2006.01)
G08G 1/052 (2006.01)

(52) U.S. Cl.
CPC ............. B60Q 9/00 (2013.01); G08G 1/052 (2013.01); G08G 1/08 (2013.01); G08G 1/162 (2013.01); G08G 1/166 (2013.01)

(58) Field of Classification Search
CPC ............. G07C 5/008; G07C 9/00126; G08G 1/096811; G08G 1/20; G08G 1/205; G08G 1/087; G08G 1/0145; G08G 1/0965; G08G 1/0104; G08G 1/096716; G08G 1/096758; G08G 1/161; G08G 1/164; G08G 1/005

USPC ........... 340/905, 903, 901, 988, 539.1, 531, 340/435–436, 907, 425.6, 902

See application file for complete search history.

(56) References Cited

U.S. PATENT DOCUMENTS

| | | | | |
|---|---|---|---|---|
| 9,008,890 | B1 * | 4/2015 | Herbach | B60W 30/00 340/435 |
| 2004/0130463 | A1 * | 7/2004 | Bloomquist | G08G 1/096716 340/907 |
| 2004/0233045 | A1 * | 11/2004 | Mays | B60K 35/00 340/425.5 |
| 2007/0008173 | A1 * | 1/2007 | Schwartz | G08G 1/081 340/902 |
| 2009/0024309 | A1 * | 1/2009 | Crucs | G08G 1/015 701/118 |
| 2012/0056757 | A1 * | 3/2012 | Caudill | B60Q 7/00 340/908 |
| 2012/0059574 | A1 * | 3/2012 | Hada | G08G 1/0112 701/119 |
| 2013/0162449 | A1 * | 6/2013 | Ginsberg | G08G 1/095 340/910 |

* cited by examiner

*Primary Examiner* — Daniel Previl
(74) *Attorney, Agent, or Firm* — Patents on Demand P.A.; Brian K. Buchheit; Scott M. Garrett

(57) ABSTRACT

A traffic flow congestion incident associated with a segment of roadway that is proximate to a responder vehicle can be established. The congestion can include a set of automobiles on the roadway. The automobiles can include a driver operated vehicle, a semi-autonomous vehicle, and an autonomous vehicle. The responder vehicle can be an emergency response vehicle associated with an emergency service or emergency entity. A notification can be conveyed to a computing device associated with the automobiles responsive to the establishing. The notification can alert the operator of the automobile that the responder vehicle is proximate.

19 Claims, 6 Drawing Sheets

ENABLING IMPROVED EMERGENCY RESPONSE VIA A VEHICLE FLOW BUFFER

CROSS REFERENCE TO RELATED APPLICATIONS

This application claims priority to the provisional application entitled "ENABLING AUTOMATED BEHAVIOR MODIFICATION RECOMMENDATIONS" filed Sep. 15, 2014 with Application No. 62/050,460, which is incorporated herein in its entirety.

BACKGROUND

The present invention relates to the field of emergency response vehicles, and more particularly to, enabling improved emergency response via a vehicle flow buffer.

Traffic congestion within crowded cities and highways are a constant nuisance to drivers and passengers alike. In many situations, traffic flow can be impeded by a few drivers (e.g., slow drivers) or a roadway accident. These seemingly random occurrence of accidents and traffic congestion can often be averted by drivers, but rarely are, due to lack of driver education about traffic flow. As such traffic congestion, accidents, and dangerous roadway conditions will continue to plague drivers.

Further, often times, emergency vehicles can be unnecessarily delayed due to traffic jams as a result of driver negligence and even accidents. In many instances, emergency vehicles utilize sirens to alert drivers of their presence. However, frequently, at busy intersections and roads, drivers can have a difficult time knowing where the emergency vehicle is when they hear the vehicle siren. Further, prior to entering areas near at busy intersections, frequently emergency vehicles often do not enable their siren making it even more difficult for drivers to respond when the vehicles are fast approaching.

BRIEF SUMMARY

One aspect of the present invention can include a system, an apparatus, a computer program product, and a method for enabling improved emergency response via a vehicle flow buffer. A traffic flow congestion incident associated with a segment of roadway that is proximate to a responder vehicle can be established. The congestion can include a set of automobiles on the roadway. The automobiles can include a driver operated vehicle, a semi-autonomous vehicle, and an autonomous vehicle. The responder vehicle can be an emergency response vehicle associated with an emergency service or emergency entity. A notification can be conveyed to a computing device associated with the automobiles responsive to the establishing. The notification can alert the operator of the automobile that the responder vehicle is proximate.

Another aspect of the present invention can include an apparatus, a computer program product, a method, and a system for enabling improved emergency response via a vehicle flow buffer. A traffic flow engine can be configured to establish a traffic flow congestion incident associated with a segment of roadway is proximate to a responder vehicle. The congestion can include of a set of automobiles on the roadway. The set of automobiles can include a driver operated vehicle, a semi-autonomous vehicle, and an autonomous vehicle. The responder vehicle can be an emergency response vehicle associated with an emergency service or emergency entity and the traffic flow engine can be able to convey a notification the automobiles responsive to the establishing. The notification can alert the operator of the automobile that the responder vehicle is proximate. A data store configured to persist a traffic flow model and a flow ruleset.

Yet another aspect of the present invention can include a system, an apparatus, a computer program product, and a method for enabling improved emergency response via a vehicle flow buffer. A traffic flow congestion incident associated with a segment of roadway that is proximate to a responder vehicle can be established, wherein the congestion comprises of a set of automobiles on the roadway, wherein the set of automobiles comprises of at least one of a driver operated vehicle, a semi-autonomous vehicle, and an autonomous vehicle, wherein the responder vehicle is an emergency response vehicle associated with an emergency service or emergency entity. A flow buffer construct for the responder vehicle can be generated based on a flow buffer parameter. The flow buffer parameter can be a user preference, a road condition, and a vehicle property. The flow buffer can be a physical area of unoccupied space in the horizontal plane around the responder vehicle. When an automobile occupies the flow buffer a notification can be conveyed to the automobiles responsive to the establishing. The notification can alert the operator of the automobile that the responder vehicle is proximate.

DETAILED DESCRIPTION

Figure 1A:
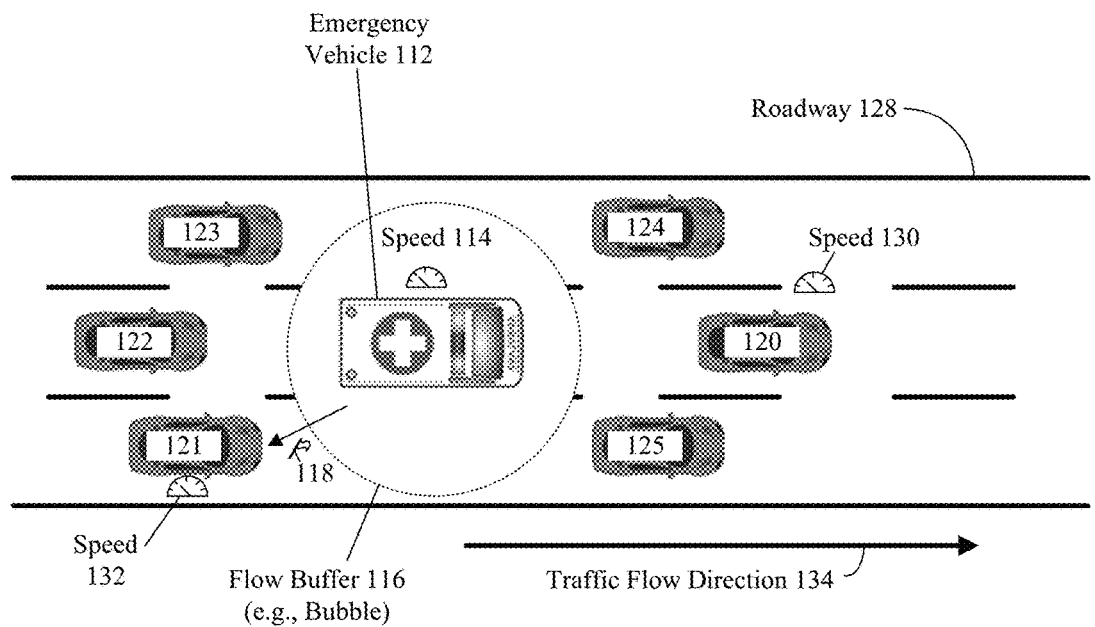
FIG. 1A illustrates a schematic diagram for a scenario for enabling improved emergency response via a vehicle flow buffer in accordance with an embodiment of the inventive arrangements disclosed herein.

The present disclosure is a solution for enabling improved emergency response via a vehicle flow buffer. In the solution, a flow buffer can be established for a responder vehicle associated with an emergency response service and/or entity. The flow buffer can be an area of unoccupied space in the horizontal plane around the responder vehicle. For example, a circular buffer 10 feet in diameter can be established for an ambulance during an emergency dispatch. The buffer can be utilized to trigger notifications to alert drivers and/or autonomous automobiles of the vehicles presence, speed, direction, and the like. In one instance, the buffer can permit a response vehicle to proceed substantially unencumbered through a segment of traffic congested roadway.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a schematic diagram for a scenario and a system for enabling improved emergency response via a vehicle flow buffer. Scenario 110 can be present in the context of system 140, method 200, and/or embodiments 310, 350, 370. In the scenario 110, a flow buffer around an emergency vehicle 112 can be manually and/or automatically established when the vehicle is in route to or from and emergency. In one instance, computer systems of the surrounding cars 120-125 can be notified of vehicle 112 presence (e.g., location, speed, direction) to enable vehicle to move significantly unencumbered on roadway 128. In one configuration of the instance, the computer system can notify a driver of the vehicle 112 presence to assist the driver in avoiding the vehicle 112. In another configuration, the system can automatically adjust the speed, position, or orientation of the car 120-125 to aid the vehicle 112 in expedient travel on roadway 128.

As used herein, car 120-125 can be wheeled, self-powered motor vehicle used for transportation. Car 120-125 can include private and commercial vehicles, including, but not limited to, an automobile, truck, a semi-truck, and the like. Car 120-125 can include, driver operated vehicles, automated vehicles, semi-automated vehicles, and the like. An automated or autonomous vehicle can be capable of fulfilling the main transportation capabilities of a traditional car. The autonomous vehicle can be capable of sensing its environment and navigating without human input. Technologies associated with autonomous and/or semi-autonomous cars include, but is not limited to, radar, LIDAR, GPS, and computer vision. It should be appreciated that advanced control systems of autonomous and/or semi-autonomous cars can interpret sensory information to identify appropriate navigation paths, as well as obstacles and relevant signage.

Emergency vehicle 112 can be any vehicle that is designated and authorized to respond to an emergency. Vehicle 112 can include, but is not limited to, emergency response vehicles (e.g., ambulances), law enforcement vehicles (e.g., police, SWAT), private contractor vehicles (e.g., SUVs), and the like.

Roadway 128 (e.g., carriageway) can be a width of road on which a vehicle is not restricted by any physical barriers or separation to move laterally. Roadway can include traffic lanes together with any associated shoulder, but may be a sole lane in width (e.g., a highway off-ramp). Roadway can include, but is not limited to, highways, surface roads, and the like. Lanes can be a part of a roadway that is designated for use by a single line of vehicles, to control and guide drivers and reduce traffic conflicts. Lanes can include, but is not limited to, traffic lane, thru lane, express lane, reversible lane, auxiliary lane, dedicated lanes, and the like.

Roadway can be associated with traffic which can include pedestrians, ridden or herded animals, vehicles, streetcars, buses and other conveyances, either singly or together, while using the public way for purposes of travel. Roadway can be associated with traffic laws which govern traffic and regulate vehicles, while rules of the road are both the laws and the informal rules that may have developed over time to facilitate the orderly and timely flow of traffic. Organized traffic generally has well-established priorities, lanes, right-of-way, and traffic control at intersections. Traffic can be formally organized in many jurisdictions, with marked lanes, junctions, intersections, interchanges, traffic signals, signs, and the like. Traffic can be classified by type: heavy motor vehicle (e.g., car, truck); other vehicle (e.g., moped, bicycle); and pedestrian. Different classes may share speed limits and easement, or may be segregated. Events which can disrupt the flow of traffic and can cause traffic to degenerate into a disorganized mess include: road construction, collisions, overcrowding of vehicles, and debris in the roadway.

Traffic congestion can be a condition on roadways or roadway networks that occurs as use increases, and is characterized by slower speeds, longer trip times, and increased vehicular queueing. The most common example is the physical use of roads by vehicles. When traffic demand is great enough, the interaction between vehicles slows the speed of the traffic stream, this results in traffic congestion. Traffic congestion can include, traffic jam, traffic snarl-up, and the like. Traffic congestion occurs when a volume of traffic (e.g., motor vehicles) or modal split generates demand for space greater than the available road capacity; this point is commonly termed saturation. It should be appreciated that traffic occurs in time and space, and can be a spatiotemporal process.

In scenario 110, a set of vehicles 112, 120-125 can travel on a roadway 118 concurrently. For example, an ambulance in route to a hospital can travel on a highway with other passenger vehicles. The vehicles 112, 120-125 can follow a traffic flow direction 134. The traffic flow can include varying speeds of vehicle 112, 120-125. For example, vehicles 112, 120-125 can travel at varying speeds 114, 130 between 50-70 miles per hour, where the ambulance (e.g., 112) can travel at 70 miles per hour and the surrounding vehicles (e.g., 120-125) can travel at 65 miles per hour.

In one use case, a traffic flow system (e.g., system 140) can be utilized to assist an emergency vehicle 112 from being encumbered by slow moving vehicles (e.g., 120, 124, 125) in front of the vehicle 112. In the use case, a flow buffer 116 can be established for the vehicle 112 which can enable the vehicle travel unencumbered on roadway 118 during an emergency by manually and/or automatically adjusting the speed 130, 132 and/or position of cars 120-125. For example, the flow buffer can be a bubble of free roadway in the horizontal plane created by automatically increasing the speed of car 120 when the vehicle 112 is behind the car 120. In one instance, the position of car 120 can be automatically adjusted to allow vehicle 112 to overtake vehicle 120. For example, car 120 can be directed to move into an adjacent lane (e.g., right lane) to allow vehicle 112 to travel past car 120. It should be appreciated that the buffer 116 is not limited to the horizontal plane and can include the vertical plane. Further, it should be appreciated that the functionality of the disclosure can be easily extended to other vehicle types including, but not limited to, boats, airplanes, and the like.

It should be appreciated that buffer 116 geometry can be arbitrary and can include a circle (e.g., multiple lanes), an oval (e.g., single lane, multiple lanes), a rectangle (e.g., single lane, multiple lanes). For example, buffer 116 can be a circular buffer with 50 foot radius (e.g., 100 foot clearance all around the vehicle 112). In one embodiment, buffer 116 can be utilized to keep the lanes adjacent (left and right) to the vehicle 112 free of cars. It should be appreciated that the buffer is not limited to a centered organization and can be positioned arbitrarily enabling the vehicle associated with the buffer to be in any point within the buffer. In one instance, the buffer can be utilized for stationary emergency and/or roadside activities. For example, when a police car is parked on the right shoulder of a road, a single lane buffer (e.g., to the left) can be established for the vehicle, enabling the officer to safely perform law enforcement activities (e.g., exit the car, interview a motorist, assist a motorist).

In another instance, the disclosure can permit a notification 118 to be communicated to an infotainment system of a car 121 to notify a driver of a recommended speed to enable buffer 116 to be maintained or created. In the instance, notification 118 can allow a driver to manually adjust speed 132 and/or position of car 121 to allow buffer 116 to exist for vehicle 112.

It should be appreciated that the flow buffer can be a functionality of a paid service which can permit vehicles of members of the service to travel in a similar unencumbered manner. For example, a bubble can be created in times of heavy traffic to enable a vehicle to continue moving during stop and go traffic jams. That is, an arbitrary express lane can be created for a single vehicle on any lane of a roadway. For example, the disclosure can be utilized to establish a single lane flow buffer to permit a fire rescue truck to travel on a busy surface road lane unencumbered.

In one embodiment, the disclosure can direct drivers of driver operated vehicles (e.g., via notification within an infotainment display) to safely pull over onto a shoulder to allow an emergency vehicle passage during times of the day when heavy traffic congestion is present. That is, the disclosure can assist drivers as well as emergency vehicle operators.

In one instance, the disclosure can allow for multiple car automated control to enable an intelligent flow control pattern to be established. In the instance, speed, position, and/or orientation of automated cars (e.g., 120-125) can be temporarily adjusted to enable emergency vehicle 112 to travel safely and quickly to a destination. That is, the traffic flow of roadway 128 can be temporarily changed to disallow gridlock, mitigate gridlock, reduce "stop and go" traffic, and the like. Further, the disclosure can make automatic adjustments to driver operated vehicles, semi-autonomous vehicles, and autonomous vehicles including, but not limited to, braking, accelerating, enabling/disabling cruise control, steering control, hazard light control, and the like.

In one use case, the disclosure can notify drivers when they are driving too close to a responder vehicle. In the use case, when a driver enters the flow buffer 116, an appropriate notification can be communicated to the driver to allow the vehicle to retain buffer 116.

Figure 1B:
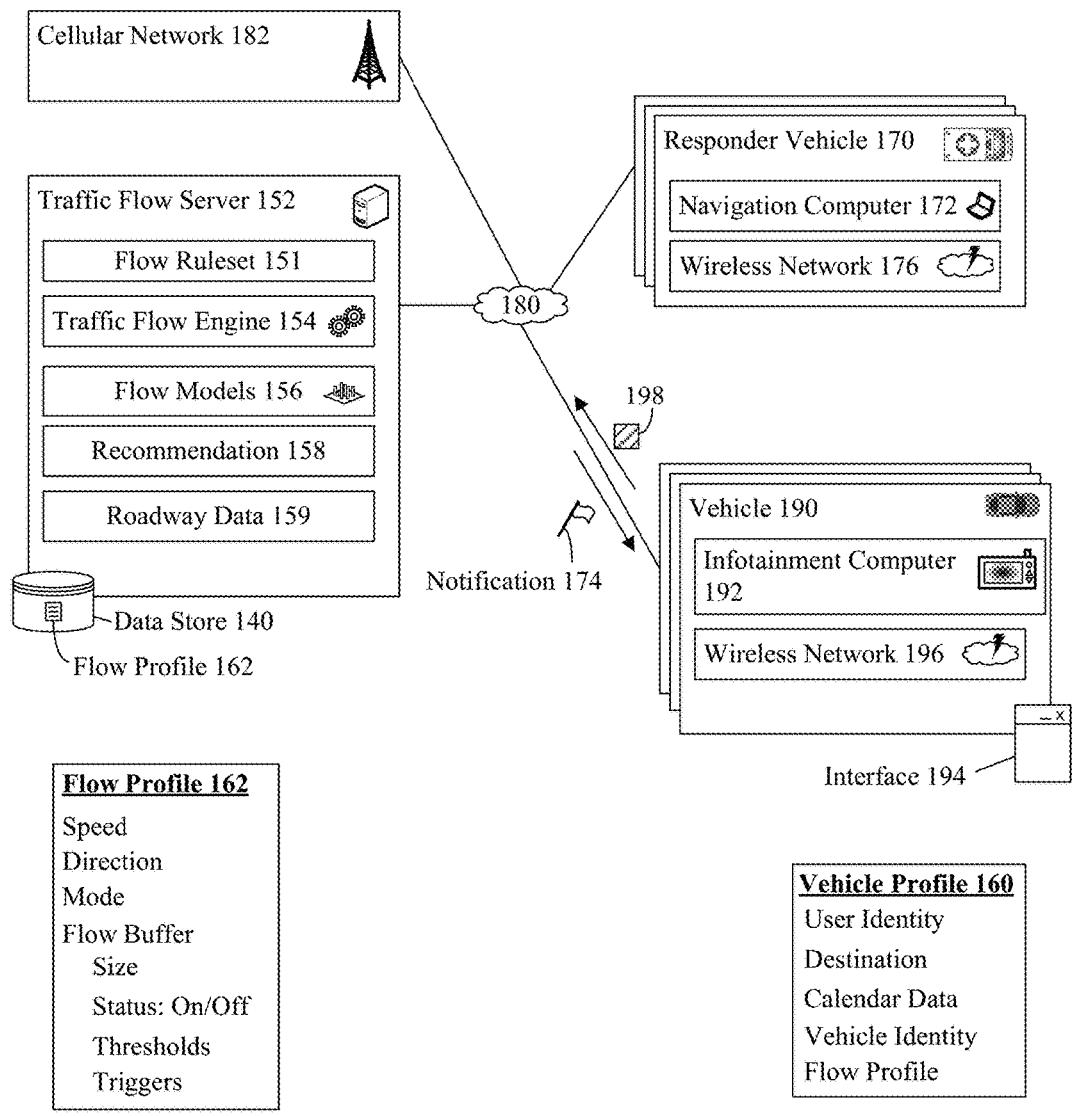
FIG. 1B illustrates a schematic diagram for a system for enabling improved emergency response via a vehicle flow buffer in accordance with an embodiment of the inventive arrangements disclosed herein.

FIG. 1B illustrates a schematic diagram for a system for enabling improved emergency response via a vehicle flow buffer. System 140 can be present in the context of scenario 110, method 200, embodiment 310, 350, and/or 370. In one instance, system 140 can permit scenario 110 to occur in real-time or near real-time. System 140 components can be communicatively linked via one or more wired and/or wireless networks. In one embodiment, system 140 can leverage existing cellular networks and/or ad-hoc in-vehicle networks 176, 196 to convey one or more notifications 174, recommendations, and/or commands. In one instance, notification 174 can override one or more infotainment interfaces to allow immediate and/or prominent display of the notification.

Traffic flow server 152 can be a hardware/software entity for executing a traffic flow engine 154. Server 152 can include, but is not limited to, flow ruleset 151, a traffic flow engine 154, flow models 156, recommendation 158, roadway data 159, data store 140, and the like. Server 152 functionality can include, but is not limited to, authentication, encryption, load balancing, and the like. In one instance, server 152 can be a component of an intelligent transportation systems (ITS), a traffic monitoring system, and the like. In one instance, data store 140 can persist flow profile 162 which can be utilized to track vehicle 170, 190 position, speed, orientation, and the like. Profile 162 can include, but is not limited to, buffer data (e.g., state), buffer parameters (e.g., thresholds), triggers (e.g., siren, congestion, dispatch calls), and the like.

In one embodiment, the disclosure can leverage one or more existing infrastructures to enable the functionality described herein. Infrastructures can include, but is not limited to, Road Weather Information System, wireless communications, computational resources, floating car data/ floating cellular data, sensing technologies (e.g., on roadway, in vehicle, inductive loop detection mechanisms, video vehicle detection, BLUETOOTH detection systems, collision avoidance systems, intelligent adaptation systems, and the like. For example, roadway condition data 198 obtained from vehicle 190 can be utilized to generate notification 174 and/or recommendation 158. It should be appreciated that data 198 can be obtained from vehicle 170 and is not limited to vehicle 190.

It should be appreciated that the disclosure can leverage traditional and/or proprietary technologies to enable the functionality described herein. In one embodiment, the disclosure can utilize a National Transportation Communications for Intelligent Transportation System Protocol (NTCIP). NTCIP can be a family of standards designed to achieve interoperability and interchangeability between computers and electronic traffic control equipment from different manufacturers. It should be appreciated that the disclosure can be seamlessly integrated within existing infrastructures to ease the burden of implementation.

Traffic flow engine 152 can be a hardware/software element for establishing a flow buffer 116 for one or more vehicles. Engine 154 functionality can include, but is not limited to, route determination, notification generation, notification conveyance, model 156 analysis, recommendation generation, and the like. In one embodiment, engine 154 can utilize car profile 160, flow profile 162 and/or additional traffic data (e.g., from vehicles 170, 190) to permit real-time traffic flow improvements, allow flow buffer 116 existence, and the like. In the embodiment, flow profile 162 can include telemetry information associated with a vehicle and vehicle profile 160 can include, but is not limited to, vehicle identity, vehicle operator identity, destination, and the like. It should be appreciated that communication can be facilitated between components via uniquely generated identifiers. For example, a unique identifier can be generated from the VIN numbers of each vehicle. It should be appreciated that ruleset 151 can be utilized to configure server 152 behavior, engine 154 behavior, system 140 behavior, and the like. It should be appreciated that engine 154 can be utilized to limit notifications to proximate cars based on proximity to responder vehicle, responder vehicle route, and the like. For example, engine 154 can allow a notification to be sent to only two cars directly in front (e.g., same lane) of a fire rescue vehicle which can be in the direct path of the fire rescue vehicle but not send notifications to cars adjacent or behind fire rescue vehicle. It should be appreciated that car selection can be performed manually and/or automatically. For example, a notification can be sent to a car by specifying a license plate of a car as the recipient of the notification.

In one instance, each vehicle 170, 190 can include a traffic flow engine 154 (e.g., or functionality) which can communicate in real-time to enable traffic flow improvements. In one embodiment, flow server 152 can be a component of an intelligent highway system.

In one instance, engine 154 can utilize flow models 156 along with real-time traffic data 198 to dynamic notifications 174 and/or recommendations 158. In the instance, traditional and/or proprietary flow models can be applied to smooth traffic congestion resulting from the presence of a responder vehicle 170. For example, the disclosure can utilize a fluid dynamics flow model to improve traffic flow of a section of highway before a responder vehicle 170 reaches the section. It should be appreciated that the disclosure is not limited to this arrangement and can decrease traffic congestion after a responder vehicle 170 has left the congestion, in absence of a responder vehicle 170, and the like.

In one embodiment, flow models 156 can include fluid dynamic based flow models (e.g., flow of a fluid in a pipe). In the embodiment, congestion simulations and real-time observations have shown that in heavy but free flowing traffic, jams can arise spontaneously, triggered by minor events ("butterfly effects"), such as an abrupt steering maneuver by a single motorist. In another embodiment, models 156 can include mathematical theories, such as Boris Kerner's three-phase traffic theory (e.g., spatiotemporal reconstruction of traffic congestion). It should be appreciated that models 156 can include a combination of macro-, micro- and mesoscopic features, and can add matrix entropy effects, by "platooning" groups of vehicles and by randomizing the flow patterns within individual segments of the network. These models can typically be calibrated by measuring actual traffic flows on the links in the network, and the baseline flows can be adjusted accordingly.

Recommendation 158 can be an automatically and/or manually generated course of action. Recommendation 158 can include, but is not limited to, a suggestion, a vehicle command, and the like. For example, recommendation 158 can be presented within a notification alerting a vehicle 190 driver that an ambulance is approaching from the left (e.g., at a junction). In one embodiment, engine 154 can leverage roadway data 159 to perform computations which can aid in generating recommendations 158. For example, engine 154 can determine a 5% increase (e.g., 2.5 mph increase) in speed for all cars along a segment of a surface road to decrease traffic congestion and convey the recommendation to the infotainment computer 192 of each vehicle 190 (e.g., which can be manually and/or automatically acted upon). It should be appreciated that recommendations 158 can be associated with safety tolerances (e.g., ruleset 151) enabling only small changes (e.g., increase/decrease) in speed to be recommended.

Roadway data 159 can be one or more data sets associated with a portion of a roadway. Roadway data 159 can include, but is not limited to, traffic light information (e.g., location, timing, status), speed limit information, school zone information (e.g., timing, location), road work information, bus lane information, high occupancy vehicle lane data, grade crossings, red light cameras, electronic signage, and the like. In one embodiment, engine 154 can utilize roadway data 159 to prevent traffic congestion by temporarily altering traffic light timing and vehicle 190 speed for an emergency vehicle to travel unencumbered through a busy intersection. That is, the engine 154 can assist in "clearing a path" for an emergency vehicle.

In one embodiment, a portion of the functionality of the disclosure can be embedded within an infotainment computer 192, vehicle computer system, and the like. In the embodiment, notification 174 can be conveyed only with manual confirmation from an authorized personnel. Further, the notification can be communicated over secure communication channels. For example, notification 174 can be communicated from vehicle 170 to vehicle 190 via a secure emergency-only wireless communication channel accessible only by a EMT personnel with an authorized access card. That is, unauthorized use of the functionality of the disclosure is easily disallowed.

In one instance, the disclosure can be utilized to assist law enforcement vehicles during traffic congestion. In the instance, the system 140 can create a free lane to permit a law enforcement vehicle to travel. For example, when a police car is in route (e.g., siren on) to a call, the system 140 can cause car 124 to switch into an adjacent lane permitting the police car to reach the call quickly.

It should be appreciated that the engine 154 can be utilized to improve driving conditions for non-autonomous vehicles (e.g., traditional cars/trucks). For example, the engine 154 can present a recommendation (e.g., within a notification 174) to a driver to decrease speed to decrease the driver's likelihood to reach an oncoming traffic jam. That is, by informing drivers of speed options, lane selection, and the like, the engine 154 can decrease congestion buildup and eliminate driver confusion. In one instance, the notification 174 of the disclosure can be presented within a personal device such as a mobile phone, car dash navigation system, and the like. In another embodiment, the engine 154 can be presented within electronic signage (e.g., temporary/permanent electronic signs). For example, the engine 154 can convey a recommendation to drivers to stay in a left lane when a right lane is congested.

It should be appreciated that the disclosure can compensate for real world constraints including, but not limited to, speed limits, traffic lights, and the like. That is, traffic flow improvements described herein can be arbitrarily complex.

It should be appreciated that the disclosure can leverage traditional and/or proprietary roadway systems to enable the functionality disclosed herein. In one embodiment, the disclosure can leverage existing toll systems (e.g., SUNPASS, E-PASS) to enable the pay-per-use scheme described herein. In the embodiment, a user can activate a personal express lane function in their car navigation system which can allow a user to travel substantially unencumbered during rush hour congestion and when a user passes a toll system can be tolled for usage. It should be appreciated that payment for a personal express lane can be computed based on usage time, congestion amount, and the like.

In another embodiment, the disclosure can enable a subscription based service for emergency personnel (e.g., EMTs, law enforcement) or non-emergency personnel. In the embodiment, a flat subscription fee can enable the use of the flow buffer during traffic congestion.

Responder vehicle 170 can be an automobile associated with a responder service and/or responder entity. Responder vehicle 170 can include, but is not limited to, navigation computer 172, wireless network 176, and the like. Navigation computer 172 can include, but is not limited to, a general purpose computer, a Global Positioning System based computer, mobile phone, a personal digital assistant (PDA), an automotive computer, and the like. For example, computer 172 can be a fleet connected laptop computer. Wireless network 175 can include, but is not limited to, Near Field Communication (NFC) networks, BLUETOOTH networks, ZIGBEE networks, Short Wave Radio networks, and the like. It should be appreciated that computer 172 can be associated with a display, an interface, and the like. It should be appreciated that vehicle 170 can include one or more sensors including, but not limited to, ultrasonic sensors, LIDAR sensors, video cameras, radar sensors, and the like. Sensors can permit real-time traffic data 198 to be collected and/or conveyed to server 152 and/or vehicle 190.

Vehicle 190 can be an automobile not associated with a responder service and/or responder entity. Vehicle 190 can include, but is not limited to, an infotainment computer 192, a wireless network 196, interface 194, and the like. Infotainment computer can be a general purpose computer, a Global Positioning System based computer, mobile phone, a personal digital assistant (PDA), an automotive computer, and the like. Wireless network 175 can include, but is not limited to, Near Field Communication (NFC) networks, BLUETOOTH networks, ZIGBEE networks, Short Wave Radio networks, and the like. Interface 194 can be a user interactive component permitting interaction and/or presentation of profile 10, 162, notification 174, recommendation 158, and the like. Interface 194 can be present within the context of a Web browser application, an operating system interface, an application interface, and the like. Interface 194 capabilities can include a graphical user interface (GUI), voice user interface (VUI), mixed-mode interface, and the like. In one instance, interface 334 can be communicatively linked to infotainment computer 192. It should be appreciated that vehicle 170 can include one or more sensors including, but not limited to, ultrasonic sensors, LIDAR sensors, video cameras, radar sensors, and the like. Sensors can permit real-time traffic data 198 to be collected and/or conveyed to server 152 and/or vehicle 170.

Data store 140 can be a hardware/software component able to persist profile 160, 162, notification 174, recommendation 158, models 156, ruleset 151, roadway data 159, and the like. Data store 140 can be a Storage Area Network (SAN), Network Attached Storage (NAS), and the like. Data store 140 can conform to a relational database management system (RDBMS), object oriented database management system (OODBMS), and the like. Data store 140 can be communicatively linked to server 152 in one or more traditional and/or proprietary mechanisms. In one instance, data store 140 can be a component of Structured Query Language (SQL) complaint database.

Network 180 can be an electrical and/or computer network connecting one or more system 140 components. Network 180 can include, but is not limited to, twisted pair cabling, optical fiber, coaxial cable, and the like. Network 180 can include any combination of wired and/or wireless components. Network 180 topologies can include, but is not limited to, bus, star, mesh, and the like. Network 180 types can include, but is not limited to, Local Area Network (LAN), Wide Area Network (WAN), Virtual Private Network (VPN) and the like.

Cellular network 182 can be a wireless network distributed over land areas called cells, each served by at least one fixed-location transceiver, known as a cell site or base station. Network 182 can include, but is not limited to, a handset, a base station, a transceiver, and the like. Network 182 can include mobile phone network operators including, but not limited to, SPRINT, AT&T, VERIZON, and the like.

Drawings presented herein are for illustrative purposes only and should not be construed to limit the invention in any regard. It should be appreciated that engine 154 can be an optional component of server 152. It should be appreciated that one or more components within system 140 can be optional components permitting that the disclosure functionality be retained. It should be understood that engine 154 components can be optional components providing that engine 154 functionality is maintained. It should be appreciated that one or more components of engine 154 can be combined and/or separated based on functionality, usage, and the like. System 140 can conform to a Service Oriented Architecture (SOA), Representational State Transfer (REST) architecture, and the like.

Figure 2:
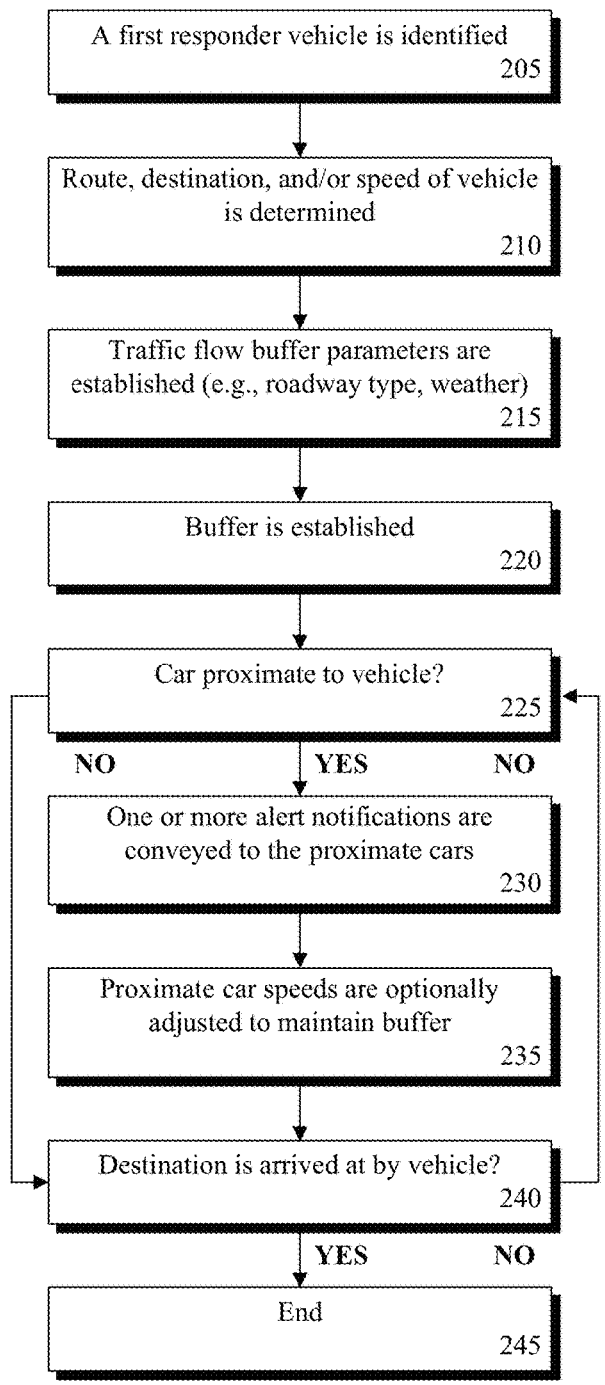
FIG. 2 illustrates a flowchart for a method for enabling improved emergency response via a vehicle flow buffer in accordance with an embodiment of the inventive arrangements disclosed herein.

FIG. 2 illustrates a flowchart for a method for enabling improved emergency response via a vehicle flow buffer. Method 200 can be performed in the context of scenario 110, system 140, embodiment 310, 350, and/or 370. In method 200, a flow buffer can be established to assist a responder vehicle to navigate through traffic congestion. It should be appreciated that the method 200 can include additional steps including, but not limited to, communication with an intelligent traffic system, intra vehicle communication, and the like.

In step 205, a first responder vehicle can be identified. The vehicle can be identified manually and/or automatically. In one instance, the vehicle can be identified responsive to a dispatch event. In step 210, the route, destination, orientation, and/or speed of the vehicle can be determined. In one instance, route, destination, orientation, and/or speed can be manually and/or automatically obtained from a computing system (e.g., dispatch computing system), an operator (e.g., dispatch operator), a vehicle operator (e.g., driver), and the like. In step 215, traffic flow buffer parameters can be stablished. In one instance, parameters can be established based on the roadway conditions, roadway properties (e.g., road type, speed limits), user preferences, and the like. It should be appreciated that buffer parameters can be utilized to establish thresholds (e.g., minimum buffer size, maximum buffer size) associated with the buffer to account for real world limitations. That is, the buffer detection and/or maintenance policies (e.g., ruleset 151) can be arbitrarily complex. For example, when more than two cars are occupying more than 20% of the buffer, one or more notifications can be communicated to the driver (e.g., or car computer) to adjust driving behavior to allow for expanding the buffer. That is, the buffer can change (e.g., grow or shrink) to accommodate vehicle size, speed, traffic congestion, and the like.

In step 220, the buffer can be established. In one embodiment, when sufficient space is not available, the buffer can be established at a smaller size and can be grown over time (e.g., as the vehicle moves through a roadway).

In step 225, if a car is proximate to vehicle, the method can continue to step 230, else continue to step 240. In step 230, one or more alert notifications can be conveyed to the proximate cars. In one instance, alert notifications can vary in priority, type, and the like. For example, an alert notification can include a graphical user interface alert message, a Short Message Service text message, and the like. In step 235, proximate car speeds can be optionally adjusted to increase and/or maintain flow buffer around the vehicle. In step 240, if the vehicle arrived at the destination, the method can continue to step 245, else return to step 225. In step 245, the method can end.

Drawings presented herein are for illustrative purposes only and should not be construed to limit the invention in any regard. It should be appreciated that method 200 can be performed in real-time or near real-time. Further, method 200 can be performed in serial and/or in parallel.

Figure 3A:
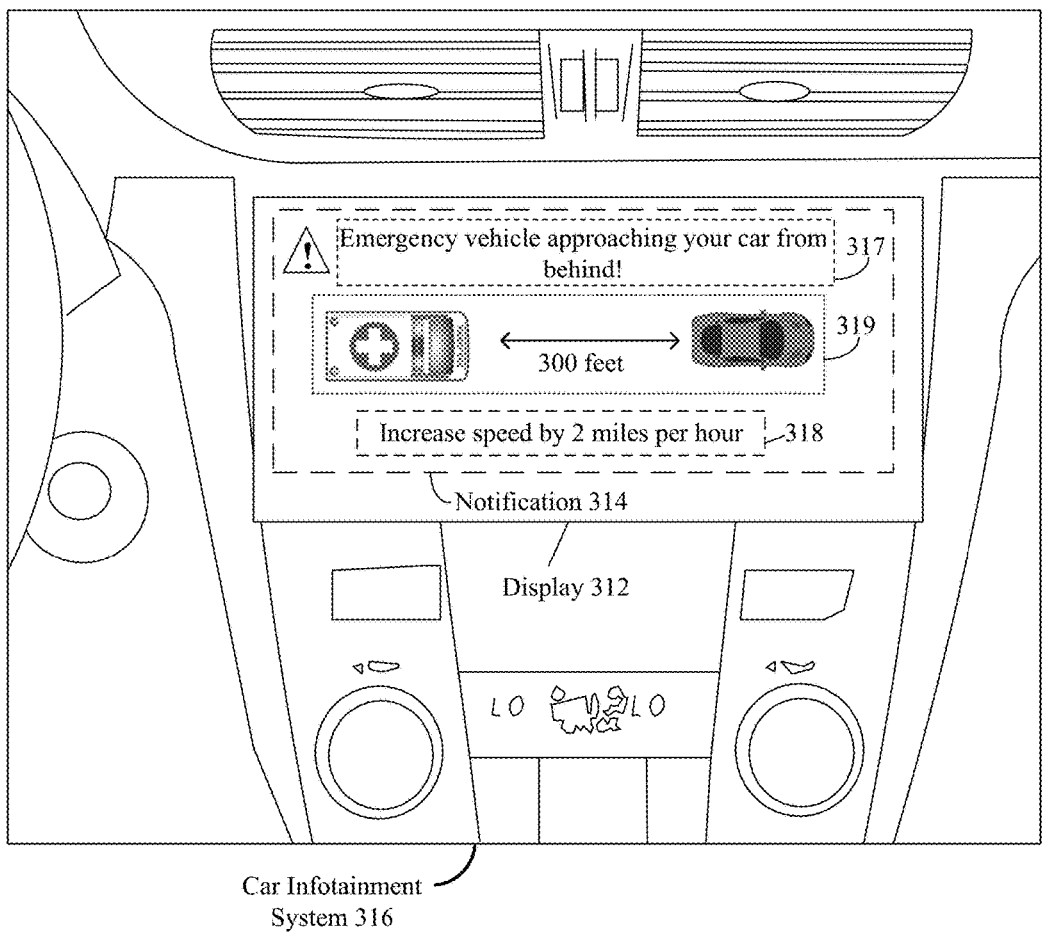
FIG. 3A illustrates a schematic diagram for an embodiment for an in-vehicle notification for enabling improved emergency response via a vehicle flow buffer in accordance with an embodiment of the inventive arrangements disclosed herein.

FIG. 3A illustrates a schematic diagram for an embodiment for an in-vehicle notification for enabling improved emergency response via a vehicle flow buffer. In embodiment 310, a notification 314 can be presented within a display 312 of a car infotainment system 316. In the embodiment, notification 314 can include an optional recommendation 318 which can assist driver and/or response vehicle in avoiding traffic congestion.

In display 312, a notification 314 with a graphical image 319 and a text message can be presented. In one instance, image 319 can indicate relative direction and/or distance of a responder vehicle from a car presenting the notification 314. For example, the image 319 or message 317 can indicate an ambulance is 300 feet behind a driver of a car presenting the notification 314. In one embodiment, a recommendation 318 can be presented within notification 314. In the embodiment, the recommendation 318 can inform the driver of a car to perform one or more actions to avoid a nearby responder vehicle, assist in clearing congestion, and the like. It should be appreciated that in one instance, notification 314 can be a voice notification (e.g., computer generated voice) which can present information within notification 314 and/or recommendation 318.

Figure 3B:
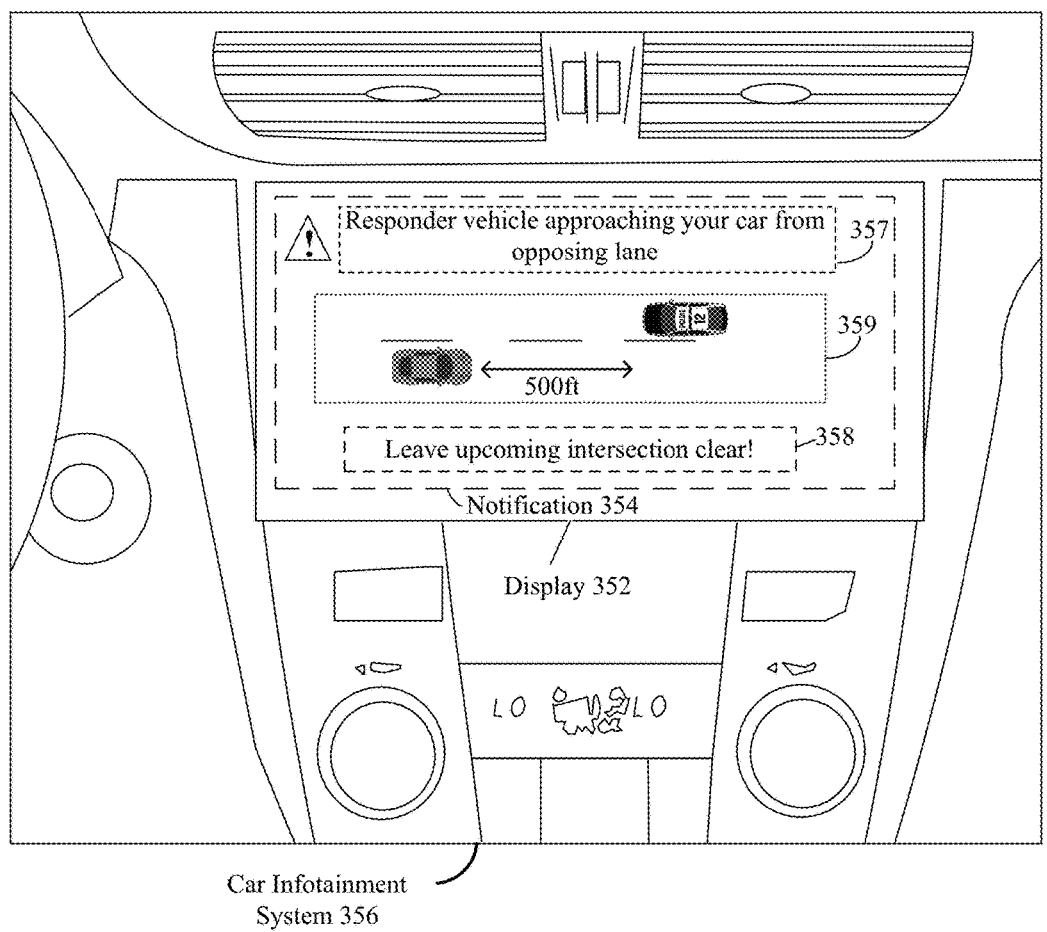
FIG. 3B illustrates a schematic diagram for an embodiment for an in-vehicle notification for enabling improved emergency response via a vehicle flow buffer in accordance with an embodiment of the inventive arrangements disclosed herein.

FIG. 3B illustrates a schematic diagram for an embodiment for an in-vehicle notification for enabling improved emergency response via a vehicle flow buffer. In embodiment 350, a notification 354 can be presented within a display 352 of a car infotainment system 356. In the embodiment, notification can include an optional recommendation 358 which can assist driver and/or response vehicle in avoiding traffic congestion.

In display 352, a notification 354 with a graphical image 359 and a text message 357 can be presented. In one instance, image 359 or message 357 can indicate relative direction and/or distance of a responder vehicle from a car presenting the notification 354. For example, the image 359 can indicate a police vehicle is in an opposing lane and 500 feet in front of a driver of a car presenting the notification 314. In one embodiment, a recommendation 358 can be presented within notification 354. In the embodiment, the recommendation 358 can inform the driver of a car to perform one or more actions to avoid a nearby responder vehicle, assist in clearing congestion, and the like. For example, the recommendation 358 can inform the driver that the intersection between the car and the police vehicle should be kept clear allowing the police vehicle to turn. It should be appreciated that in one instance, notification 354 can be a voice notification (e.g., computer generated voice) which can present information within notification 354 and/or recommendation 358.

Figure 3C:
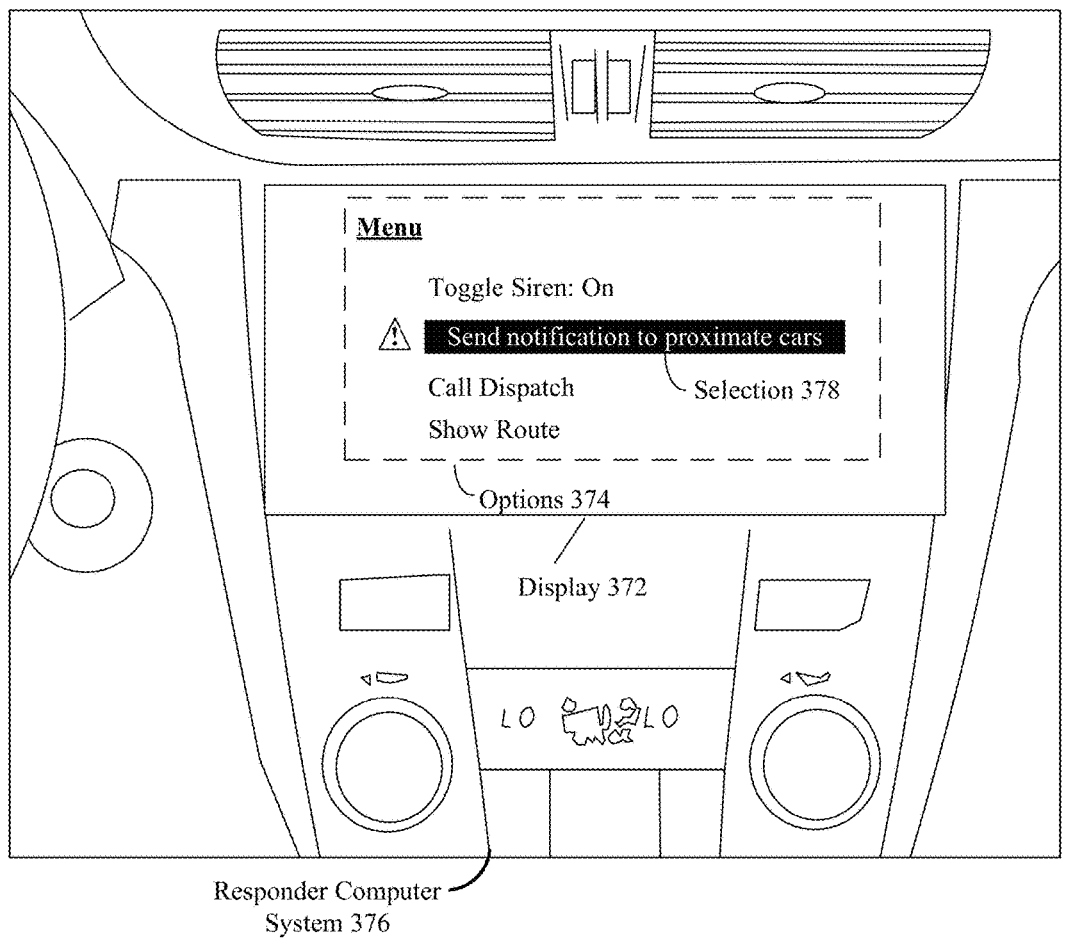
FIG. 3C illustrates a schematic diagram for an embodiment for an in-vehicle notification for enabling improved emergency response via a vehicle flow buffer in accordance with an embodiment of the inventive arrangements disclosed herein.

FIG. 3C illustrates a schematic diagram for an embodiment for an in-vehicle notification for enabling improved emergency response via a vehicle flow buffer. In embodiment 370, a set of options 374 can be presented within a display 372 of a responder vehicle responder computer system 376. In the embodiment, options 374 can present one or more responder vehicle actions which can assist the responder vehicle operator in avoiding traffic congestion.

In display 372, options 374 can be presented which can include, but is not limited to, siren control options, notification options, dispatch communication options, route options. In one instance, selection 376 of a notification option can trigger a notification to be presented within infotainment systems (e.g., or mobile phones) of proximate cars (e.g., embodiment 310, 350). For example, selection 376 can permit a passenger of the responder vehicle to convey a notification to several cars blocking an intersection. It should be appreciated that notification type, message, and the like can be customized or can be standardized. In one instance, selection 376 can be automatically trigged (e.g., and a notification can be sent) when the responder vehicle siren is not enabled.

In one embodiment, selection 376 can trigger one or more self-driving (e.g., autonomous) or semi-autonomous cars to automatically disperse and dissipate a traffic congestion incident by permitting cars to move as a unit or individually to dissipate the incident.

The flowchart and block diagrams in the FIGS. 1A-3C illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for improving traffic flow for a responder vehicle for improved emergency response via a vehicle flow buffer comprising:
   communicatively linking, via a network comprising hardware, a remotely located traffic flow server to a computing device of a responder vehicle and to a set of computing devices of a set of motor vehicles, wherein the communicatively linking occurs as the responder vehicle and the set of motor vehicles travel along a roadway, wherein the traffic flow server, the computing device of the responder vehicle, and the set of computing devices each comprises hardware of a processor able to execute computer program instructions for implementing functions;
   establishing at the traffic flow server, that the responder vehicle is in route to or from an emergency;
   establishing at the traffic flow server, a flow profile for the responder vehicle, said flow profile defining a speed, direction, of the responder vehicle and defining a flow buffer for the responder vehicle, wherein said traffic flow server continuously receives updated information over the network as the responder vehicle and the set of motor vehicles travel along the roadway, which is used to continuously update the flow profile;
   determining, at the traffic flow server, a traffic flow congestion incident associated with a segment of the roadway experiencing traffic flow congestion caused by the set of motor vehicles impeding travel of the responder vehicle along the roadway;
   conveying a notification from the traffic flow server to each of the set of computing devices responsive to the determining of the traffic flow congestion, wherein each notification alerts a respective one of the motor vehicles that receives the respective notification to temporarily adjust speed, position, orientation, or two or more of speed, position, and orientation of that motor vehicle on the roadway in order to maintain the flow buffer around the responder vehicle and to permit the responder vehicle to travel along the roadway without experiencing congestion that would occur but for the respective motor vehicles making the temporarily adjustments per the respective notifications.

2. The method of claim 1, wherein the respective notification indicates the direction and distance of between the responder vehicle and the one of the motor vehicles that receives the respective notification.

3. The method of claim 1, wherein the respective notification comprises of a recommendation, wherein the recommendation is a course of action which an operator of the motor vehicle receiving the respective notification is able to perform.

4. The method of claim 3, wherein the course of action is at least one of a lane change, a speed increase, and a speed decrease.

5. The method of claim 1, wherein the respective notification automatically triggers a course of action to be performed by the automobile.

6. The method of claim 5, wherein the course of action is at least one of a lane change, a speed increase, and a speed decrease.

7. The method of claim 1, further comprising:
   analyzing, at the traffic flow server, the traffic flow congestion incident to determine at least one impedance, wherein the impedance is associated with at least one of a vehicular accident, an emergency, and a roadway saturation.

8. The method of claim 1, further comprising:
   defining at the traffic flow server a geometry for the flow buffer, wherein a size of the geometry defined by the traffic flow server varies based on roadway conditions.

9. The method of claim 1, wherein the traffic flow server uses the traffic buffer to trigger the notifications to alert the motor vehicles of the responder vehicle presence, speed, and direction.

10. The method of claim 1, wherein the traffic buffer corresponds to a physical area of unoccupied space in the horizontal plane around the responder vehicle, enabling the responder vehicle to travel substantially unencumbered through the segment of roadway.

11. The method of claim 10, wherein the adjusting is performed by a paid service.

12. The method of claim 1, wherein each of the notification causes each of the set of motor vehicles adjusting a speed, position, an orientation, or two or more of speed, position, and orientation in response to receiving the respective one of the notifications, wherein the set of motor vehicles are autonomous vehicles or semi-autonomous vehicles.

13. A system for improving traffic flow for a responder vehicle for improved emergency response via a vehicle flow buffer comprising:
  a traffic flow server comprising hardware of a processor able to execute computer program instructions for implementing functions to:
  communicatively link, via a network comprising hardware, the traffic flow server to a computing device of a responder vehicle and to a set of computing devices of a set of motor vehicles, wherein the communicatively linking occurs as the responder vehicle and the set of motor vehicles travel along a roadway, wherein the computing device of the responder vehicle, and the set of computing devices each comprises hardware of a processor able to execute computer program instructions for implementing functions;
  establish at the traffic flow server, that the responder vehicle is in route to or from an emergency;
  establish at the traffic flow server, a flow profile for the responder vehicle, said flow profile defining a speed, direction, of the responder vehicle and defining a flow buffer for the responder vehicle, wherein said traffic flow server continuously receives updated information over the network as the responder vehicle and the set of motor vehicles travel along the roadway, which is used to continuously update the flow profile;
  determine at the traffic flow server, a traffic flow congestion incident associated with a segment of the roadway-experiencing in traffic flow congestion caused by the set of motor vehicles impeding travel of the responder vehicle along the roadway;
  convey a notification from the traffic flow server to each of the set of computing devices responsive to the determining of the traffic flow congestion, wherein each notification alerts a respective one of the motor vehicles that receives the respective notification to temporarily adjust speed, position, orientation, or two or more of speed, position, and orientation of that motor vehicle on the roadway in order to maintain the flow buffer around the responder vehicle and to permit the responder vehicle to travel along the roadway without experiencing congestion that would occur but for the respective motor vehicles making the temporarily adjustments per the respective notifications.

14. The system of claim 13, wherein the computing device of the responder vehicle is able to wirelessly communicate with traffic flow server via the network in real-time.

15. The system of claim 13, wherein the respective notification indicates the direction and distance of between the responder vehicle and the one of the motor vehicles that receives the respective notification.

16. The system of claim 13, wherein the respective notification comprises of a recommendation, wherein the recommendation is a course of action which an operator of the motor vehicle receiving the respective notification is able to perform.

17. The system of claim 13, wherein the course of action is at least one of a lane change, a speed increase, and a speed decrease.

18. The system of claim 13, wherein the respective notification automatically triggers a course of action to be performed by the automobile.

19. The system of claim 18, wherein the course of action is at least one of a lane change, a speed increase, and a speed decrease.

* * * * *